United States Patent
Lee

(10) Patent No.: US 9,528,835 B2
(45) Date of Patent: Dec. 27, 2016

(54) TERMINAL, VEHICLE COMMUNICATING WITH TERMINAL AND METHOD OF CONTROLLING THE SAME

(71) Applicant: Hyundai Motor Company, Seoul (KR)

(72) Inventor: Seung Gheol Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/791,501

(22) Filed: Jul. 6, 2015

(65) Prior Publication Data
US 2016/0161261 A1 Jun. 9, 2016

(30) Foreign Application Priority Data
Dec. 9, 2014 (KR) .................... 10-2014-0175773

(51) Int. Cl.
| | | |
|---|---|---|
| G01C 21/20 | (2006.01) | |
| G01C 21/36 | (2006.01) | |
| G01S 19/51 | (2010.01) | |
| G01C 21/16 | (2006.01) | |
| G01S 19/48 | (2010.01) | |

(52) U.S. Cl.
CPC ............ G01C 21/20 (2013.01); G01C 21/165 (2013.01); G01C 21/3629 (2013.01); G01S 19/48 (2013.01); G01S 19/51 (2013.01)

(58) Field of Classification Search
CPC ... G01C 21/20; G01C 21/3629; G01C 21/165; G01S 19/51
USPC .......................................................... 701/431
See application file for complete search history.

(56) References Cited

U.S. PATENT DOCUMENTS

| | | | | |
|---|---|---|---|---|
| 2002/0193121 | A1* | 12/2002 | Nowak | H04W 4/22 455/456.1 |
| 2009/0088977 | A1* | 4/2009 | Yasuhara | G08G 1/005 701/494 |
| 2010/0195847 | A1* | 8/2010 | Ieda | G01C 21/265 381/119 |

FOREIGN PATENT DOCUMENTS

| | | |
|---|---|---|
| JP | H06331375 A | 12/1994 |
| JP | 2002-350157 A | 12/2002 |
| JP | 2005-025037 A | 1/2005 |

(Continued)

OTHER PUBLICATIONS

Notice of Patent Allowance for Korean Patent Application No. 10-2014-0175773, dated May 4, 2016, English Abstract, 7 pages.

*Primary Examiner* — Anne M Antonucci
(74) *Attorney, Agent, or Firm* — Mintz Levin Cohn Ferris Glovsky and Popeo, P.C.; Peter F. Corless

(57) ABSTRACT

A vehicle that communicates with an external terminal, the vehicle comprising: a location obtaining unit configured to receive satellite signals from a plurality of satellites and obtain current location information indicating a current location of the vehicle based on the received satellite signals; a detecting unit configured to detect driving information of the vehicle; a control unit configured to measure a time delay for information transmission and reception with the terminal, correct the current location information based on the measured time delay and the detected driving information, control transmission of the corrected current location information, and control an output of navigation information received from the terminal; a communication unit configured to transmit the corrected current location information to the terminal and receive the navigation information transmitted from the terminal; and an output unit configured to output the received navigation information.

17 Claims, 13 Drawing Sheets

(56) References Cited

FOREIGN PATENT DOCUMENTS

| | | |
|---|---|---|
| JP | 2007-241726 A | 9/2007 |
| JP | 2008-224361 A | 9/2008 |
| JP | 2009-085761 A | 4/2009 |
| KR | 10-2008-0025582 A | 3/2008 |

* cited by examiner

TERMINAL, VEHICLE COMMUNICATING WITH TERMINAL AND METHOD OF CONTROLLING THE SAME

CROSS-REFERENCE TO RELATED APPLICATION

This application claims priority to and the benefit of Korean Patent Application No. 10-2014-0175773, filed on Dec. 9, 2014 in the Korean Intellectual Property Office, the disclosure of which is incorporated herein in its entirety by reference.

BACKGROUND

1. Technical Field

Embodiments of the present disclosure relate to a terminal for performing an improved navigation function of providing guidance on a path to a destination selected by a user, a vehicle communicating with the terminal, and a method of controlling the same.

2. Description of the Related Art

Many current vehicles include functions directed toward improving user convenience relating to, for example, audio, video, navigation, air conditioning, seat-heating, communicating with an external terminal, and so forth, in addition to typical driving functionalities. Moreover, many current vehicles include a terminal for manipulating functionality relating to audio, video, navigation, and the like, and for outputting operation relevant information.

In particular, the navigation functionality involves receiving location information from a plurality of satellites through a global positioning system (GPS), computing a current location of a vehicle, displaying the computed location by mapping it on a map (i.e., map matching), receiving a destination from a user, performing a search for a path from the computed current location to the destination according to a predetermined path search algorithm, displaying the found path by mapping it on a map, and providing the user with guidance to the destination along the path. When guidance on a path is provided, the terminal displays a graphic map at an intersection of roads in order for a user to clearly recognize a ramp or creating a split screen in which a graphic map in its original scale is displayed on one side and a graphic map in which the intersection is enlarged is displayed on the other side. Also, during communication, the terminal requests a path search from an external server, receives the found path from the server, provides guidance on the path to the user, and when the destination is changed while driving or the vehicle deviates from the path, requests a path update from the server, receives a new path from the server, and provides guidance on the updated path.

When path information is provided from the outside (i.e., an external source, such as a remote server) in this manner, a problem can arise due to a difference between a updated path and an actual location of the vehicle. Also, the terminal provided in the vehicle communicates with the user's terminal, receives map and location information from the user's terminal, and provides guidance on the path using the received map and location information. In such a case, another problem can arise due to an amount of time needed to receive the map and location information from the user's terminal and to display the information. Consequently, there is a delay between the actual location of the vehicle and a location displayed on a map.

SUMMARY

One aspect of the present disclosure provides a vehicle that corrects a current location of a vehicle based on an information transmission and reception time with a terminal, transmits the corrected location of the vehicle to a user's terminal, and receives and outputs navigation information transmitted from the terminal, and a method of controlling the same. Another aspect of the present disclosure provides a vehicle that corrects a current location of the vehicle based on speed information and steering angle information, transmits the corrected location of the vehicle to a user's terminal, and receives and outputs navigation information transmitted from the terminal, and a method of controlling the same. Still another aspect of the present disclosure provides a terminal that generates navigation information by mapping a corrected location of a vehicle according to map information and provides the generated navigation information to the vehicle and a method of controlling the same.

According to embodiments of the present disclosure, there is provided a vehicle that communicates with an external terminal, the vehicle including: a location obtaining unit configured to receive satellite signals from a plurality of satellites and obtain current location information indicating a current location of the vehicle based on the received satellite signals; a detecting unit configured to detect driving information of the vehicle; a control unit configured to measure a time delay for information transmission and reception with the terminal, correct the current location information based on the measured time delay and the detected driving information, control transmission of the corrected location information, and control an output of navigation information received from the terminal; a communication unit configured to transmit the corrected current location information to the terminal and receive the navigation information transmitted from the terminal; and an output unit configured to output the received navigation information.

The driving information may include speed information of the vehicle, and the detecting unit may include a speed detecting unit configured to detect a speed of the vehicle.

The driving information may include speed information of the vehicle and steering angle information of the vehicle, and the detecting unit may include a speed detecting unit configured to detect a speed of the vehicle and a steering angle detecting unit configured to detect a steering angle of the vehicle.

The steering angle detecting unit may be further configured to detect an angular velocity of a steering wheel, and the control unit may be further configured to obtain a speed vector based on the speed of the vehicle, obtain a movement distance using the obtained speed vector and a time of the measured time delay, identify a change in an angle based on the detected angular velocity, and correct the current location information based on the obtained movement distance and the identified change in the angle.

The output unit may include a display unit configured to display image information in the received navigation information and a sound unit configured to output sound information in the received navigation information, and the control unit may be further configured to decode and render of the image information in the received navigation information and amplify sound information in the received navigation information.

The control unit may be further configured to perform time synchronization with the terminal when information is transmitted to and received from the terminal.

When time synchronization with the terminal is completed, the control unit may be further configured to count a time from when the current location information is obtained until the current location information is corrected, count a time from when the corrected current location information is transmitted to the terminal until map information to which the corrected current location information is mapped is received, sum the counted time, and set the time delay based on the summed time.

The control unit may be further configured to periodically update the set time delay.

Furthermore, according to embodiments of the present disclosure, there is provided a terminal that communicates with a vehicle, the terminal including: a storage unit configured to store map information; a communication unit configured to receive corrected current location information of the vehicle transmitted from the vehicle, the corrected current location information including information in which a current location of the vehicle is corrected based on time delay information and driving information of the vehicle; and a control unit configured to generate navigation information by mapping the corrected current location information of the vehicle to the stored map information, and control the communication unit to transmit the generated navigation information.

The navigation information may include image information in which map information to which the corrected current location information is mapped is displayed as an image and sound information in which guidance information corresponding to the corrected current location information is included as a sound, and the control unit may encode the image information and the sound information.

The storage unit may be further configured to periodically update and store the map information.

Furthermore, according to embodiments of the present disclosure, there is provided a method of controlling a vehicle that communicates with an external terminal, the method, including: obtaining current location information indicating a current location of the vehicle based on a satellite signal received by a global positioning system (GPS) reception unit when a navigation function is selected; measuring a time delay for information transmission and reception with the terminal; detecting driving information of the vehicle; correcting the current location information based on the measured time delay and the detected driving information; transmitting the corrected current location information to the terminal; and outputting navigation information that is received from the terminal.

The detecting of the driving information of the vehicle may include detecting a speed of the vehicle.

The correcting of the current location information based on the measured time delay and the driving information may include: obtaining a speed vector based on the speed of the vehicle and obtaining a movement distance using the obtained speed vector and a time of the measured time delay; and correcting the current location information based on the obtained movement distance.

The detecting of the driving information of the vehicle may include detecting a speed of the vehicle and an angular velocity of a steering wheel of the vehicle.

The correcting of the current location information based on the measured time delay and the driving information may include: obtaining a speed vector based on the speed of the vehicle; obtaining a movement distance using the obtained speed vector and a time of the measured time delay; identifying a change in an angle based on the detected angular velocity; and correcting the current location information based on the obtained movement distance and the identified change in the angle.

The received navigation information may include image information in which the corrected current location information is mapped to map information stored in the terminal.

The outputting of the received navigation information may include: decoding and rendering image information in the received navigation information; displaying the rendered image information; amplifying sound information in the received navigation information; and outputting the amplified sound information.

The measuring of the time delay may include performing time synchronization with the terminal.

The measuring of the time delay may include: counting a time from when the current location information is obtained until the current location information is corrected; counting a time from when the corrected current location information is transmitted to the terminal until map information to which the corrected location information is mapped is received; summing the counted times; and setting time delay based on the summed time.

Furthermore, according to embodiments of the present disclosure, there is provided a vehicle that communicates with an external terminal, the vehicle including: a location obtaining unit configured to receive satellite signals from a plurality of satellites and obtain current location information indicating a current location of the vehicle based on the received satellite signals; a detecting unit configured to detect driving information of the vehicle; a vehicle terminal configured to measure a time delay for information transmission and reception with the external terminal, correct the current location information based on the measured time delay and the detected driving information, transmit the corrected current location information to the external terminal, and receive navigation information from the external terminal; and a communication unit configured to transmit the corrected current location information to the external terminal and the navigation to the vehicle terminal.

The driving information may include speed information of the vehicle and steering angle information of the vehicle; and the detecting unit includes a speed detecting unit configured to detect a speed of the vehicle and a steering angle detecting unit configured to detect a steering angle of the vehicle.

The vehicle terminal may be further configured to decode the received navigation information, separate the received navigation information into image information and sound information and render the decoded image information.

The vehicle terminal may be further configured to perform time synchronization with the external terminal and periodically update the measured time delay.

The navigation information may include map information to which the corrected current location information is mapped.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF THE EMBODIMENTS

Figure 1:
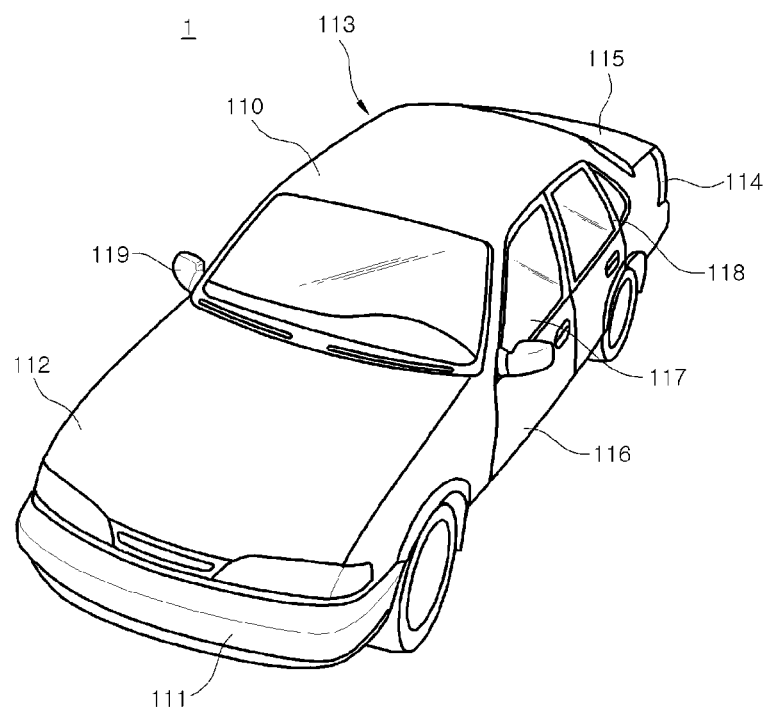
FIG. 1 is a diagram illustrating an exterior of a vehicle according to embodiments of the present disclosure.

Hereinafter, the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Figure 2:
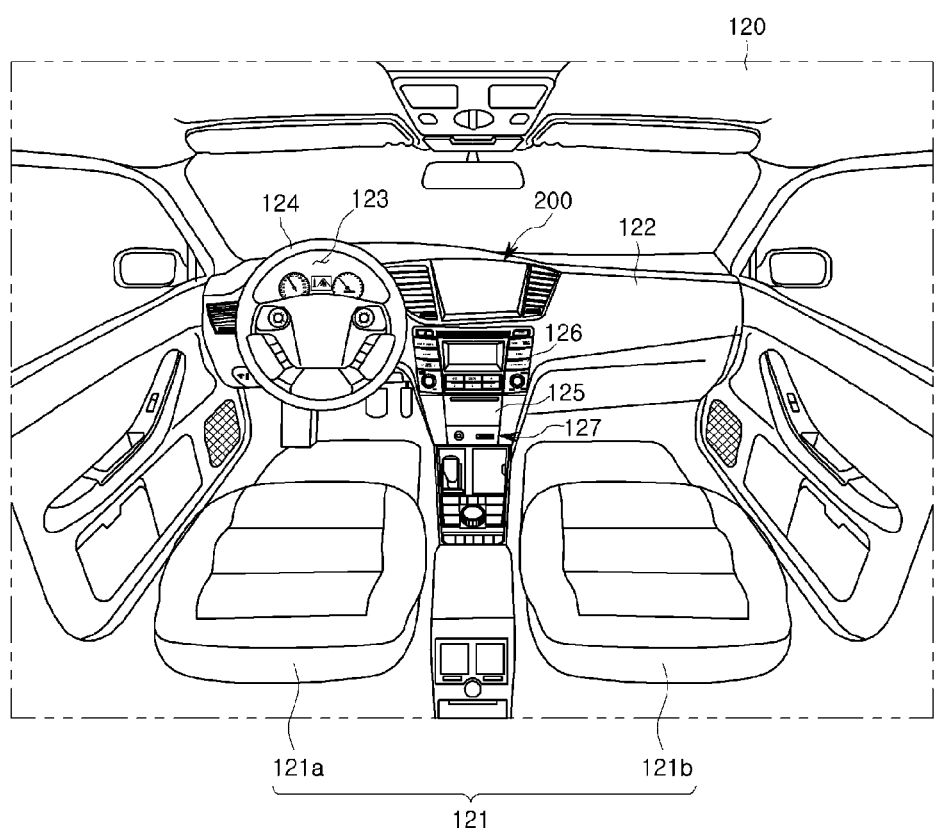
FIG. 2 is a diagram illustrating an exemplary interior of the vehicle according to embodiments of the present disclosure.

FIG. 1 is a diagram illustrating an exterior of a vehicle according to embodiments of the present disclosure. FIG. 2 is a diagram illustrating an exemplary interior of the vehicle according to embodiments of the present disclosure.

As is well-known in the art, a vehicle 1 moves (e.g., using wheels) in order to transport a human or goods and travels along roads. The vehicle 1 includes a body including an interior part and an exterior part and a chassis that is the remaining part after excluding the body and in which a mechanical device necessary for driving is installed.

As illustrated in FIG. 1, an exterior part 110 of the body includes a front panel 111, a hood 112, a roof panel 113, a rear panel 114, a trunk 115, front, rear, left and right doors 116, and a glass window 117 that is installed at the front rear, left and right doors 116 and is able to be opened or closed. The exterior part of the body includes pillars 118 that are provided in a boundary among the front panel, the hood, the roof panel, the rear panel, the trunk, and the glass windows of the front rear, left and right doors. The window glass 117 further includes a side glass window installed in the front rear, left and right doors, a quarter glass window that is installed between the pillars and is unable to be opened or closed, a rear glass window that is installed at a rear side and a front glass window installed at a front side. The exterior part of the body further includes a side mirror 119 configured to provide a rear view of the vehicle 1 to a driver.

As illustrated in FIG. 2, an interior part 120 of the body includes a seat 121 on which a passenger sits, a dashboard 122, an instrument panel (that is, a cluster 123) that is provided on the dashboard and in which a tachometer, a speedometer, a coolant thermometer, a fuel system, a direction switch indicating lamp, a high beam indicating lamp, a warning lamp, a seat belt warning lamp, a distance recorder, an odometer, an automatic transmission selection lever indicating lamp, a door open warning lamp, an engine oil warning lamp, and a fuel shortage warning lamp are provided, a steering wheel 124 configured to manipulate a vehicle direction, and a center fascia 125 in which a ventilation opening and an adjustment plate of an air conditioning unit are provided and an audio device is provided.

The seat 121 includes a driver's seat 121a on which a driver sits, a passenger's seat 121b on which a passenger sits, and a back seat that is located at the rear side inside the vehicle. The cluster 123 may be implemented as a digital type. That is, the digital type cluster 123 displays vehicle information and driving information as an image. The center fascia 125 is located between the driver's seat 121a and the passenger's seat 121b in the dashboard 122 and includes a head unit 126 for adjusting the audio device, the air conditioning unit and a heater. A ventilation opening, a cigar jack, a terminal 200 and the like may be installed in the center fascia 125.

Also, a multi-terminal 127 for enabling data communication between the vehicle terminal 200 and a user's terminal 300 is provided in the center fascia 125. The multi-terminal 127 includes a universal serial bus (USB) port and an auxiliary (AUX) terminal, may further include an secure digital (SD) card slot, is disposed at a location adjacent to the head unit 126, and may be disposed adjacent to the vehicle terminal 200, and may be electrically connected to the vehicle terminal for a vehicle 200 and an external device through a connector or a cable. The external device includes a storage device, the user's terminal 300, an MP3 player, and the like. The storage device includes a card type memory and an external hard disk. The user's terminal 300 includes a smartphone, a notebook, a tablet and the like.

Hereinafter, the vehicle terminal 200 provided in the vehicle is denoted as a first terminal in order to distinguish it from the user's terminal 300. The first terminal 200 may also be installed on the dashboard in a mountable manner. The first terminal communicates with the user's terminal 300 and transmits and receives information. That is, the first terminal 200 is a device that transmits destination information input by the user to the user's terminal 300 and outputs navigation information provided from the user's terminal 300, and performs a navigation function.

Hereinafter, the user's terminal 300 is denoted as a second terminal in order to distinguish it from the terminal 200 provided in the vehicle. The second terminal, which is the user's terminal 300, may communicate with the vehicle 1 and an external server. The external server may be a server that provides map information.

The first terminal 200 may output content received from the outside (e.g., from an external source, such as a remote server or terminal), images and sounds of information stored in a storage medium in addition to the navigation function, and may also perform an audio function for outputting an audio signal transmitted from the outside.

The vehicle 1 further includes a location obtaining unit 130 configured to obtain information on a current location of the vehicle in order to perform the navigation function using the first terminal 200. The location obtaining unit 130 includes a GPS reception unit, receives current location information, which indicates a current location of the vehicle, provided from a plurality of satellites and obtains a location of the vehicle based on the current location information.

The chassis of the vehicle includes a power generating device, a power delivering device, a driving device, a steering device, a braking device, a suspension device, a transmission device, a fuel device, front, rear, left and right wheels and the like. Also, the vehicle may include several safety devices for the driver and passenger's safety. The safety device of the vehicle includes several types of safety devices such as an airbag control device configured to ensure safety of the passenger such as the driver in the event of a vehicle crash and an electronic stability control (ESC) device configured to control an orientation of the vehicle when the vehicle accelerates and turns.

In addition, the vehicle 1 may further include a detecting device such as a proximity sensor configured to detect obstacles at the side or rear thereof or another vehicle, a rain sensor configured to detect rain and precipitation, a wheel speed sensor configured to detect a speed of front, rear, left and right wheels, an accelerometer sensor configured to detect acceleration of the vehicle, and an angular velocity sensor configured to detect a steering angle of the vehicle. The vehicle 1 includes an electronic control unit (ECU) configured to control driving of the power generating device, the power delivering device, the driving device, the steering device, the braking device, the suspension device, the transmission device, the fuel device, and several types of safety devices, and various detecting devices. Also, the vehicle 1 may further include an electronic device such as a hands free device, the GPS reception unit, an audio device, a Bluetooth device, a rear view camera, a charging device of the user's terminal and a high-pass device which are provided for a driver's convenience. The vehicle 1 may further include a starter button for inputting an operation command to a starter motor (not illustrated). That is, the vehicle 1 operates the starter motor (not illustrated) when the starter button is turned on and drives an engine (not illustrated) that is the power generating device through an operation of the starter motor. The vehicle 1 further includes a battery (not illustrated) that is electrically connected to the terminal, the audio device, a courtesy light, the starter motor, and other electronic devices and provides driving power. The battery performs charging using a self-generator or power of the engine while driving.

Figure 3:
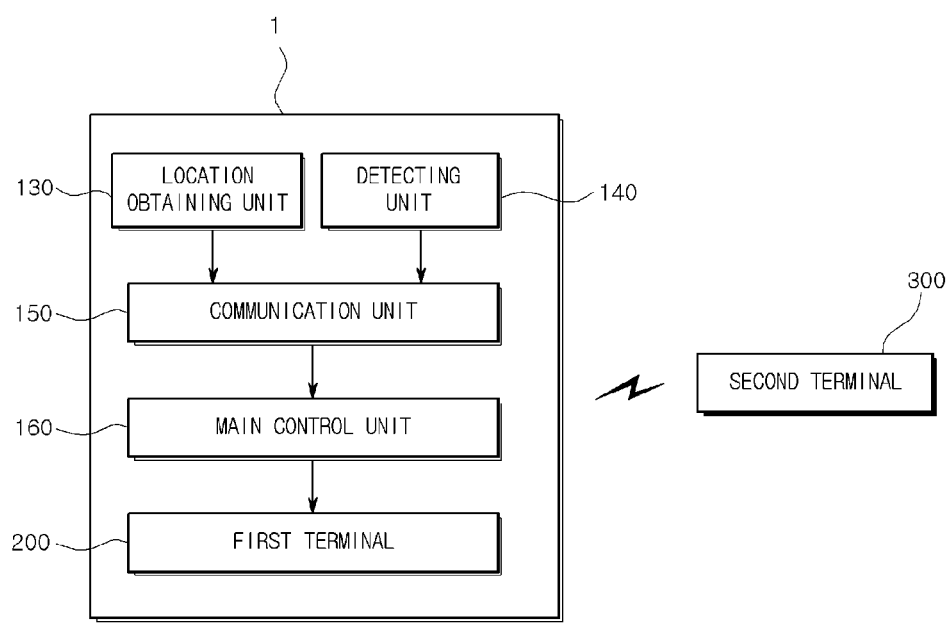
FIG. 3 is a control configuration diagram of the vehicle according to embodiments of the present disclosure.
Figure 4:
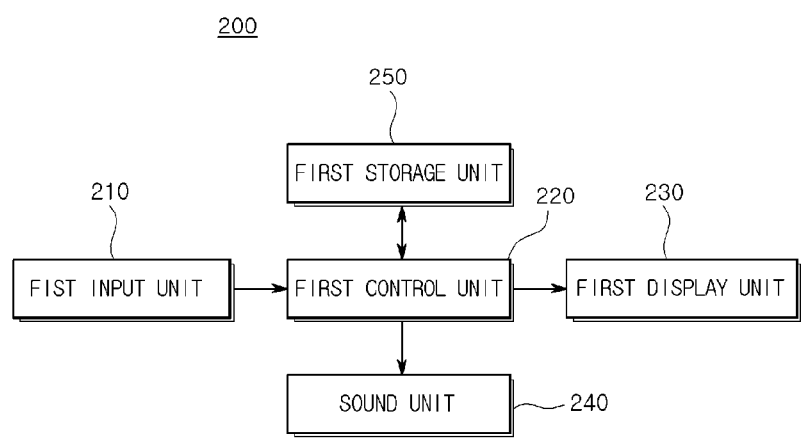
FIG. 4 is a control configuration diagram of a terminal provided in the vehicle according to embodiments of the present disclosure.
Figure 5:
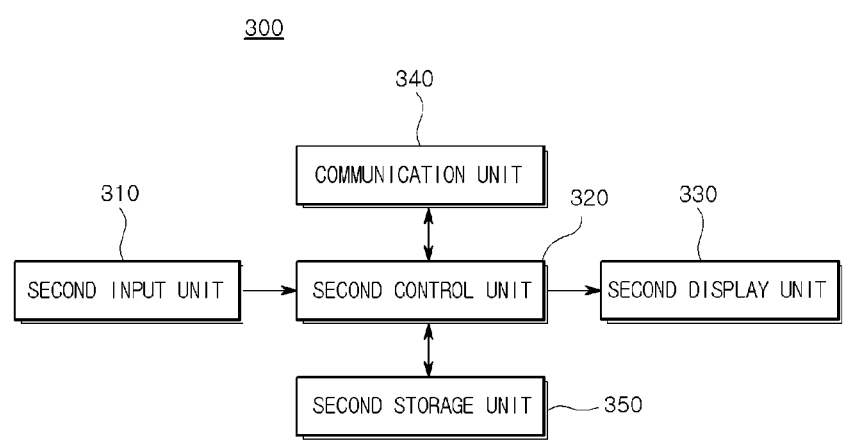
FIG. 5 is a control configuration diagram of a terminal that communicates with the vehicle according to embodiments of the present disclosure.

FIG. 3 is a control configuration diagram of the vehicle according to embodiments of the present disclosure. Description will be provided with reference to FIGS. 3 and 4. FIG. 4 is a control configuration diagram of a terminal provided in the vehicle according to embodiments of the present disclosure. FIG. 5 is a control configuration diagram of a terminal that communicates with the vehicle according to embodiments of the present disclosure.

As illustrated in FIG. 3, the vehicle 1 includes the location obtaining unit 130 (alternatively referred to herein as "location obtainer"), a detecting unit 140 (alternatively referred to herein as "detector"), a communication unit 150 (alternatively referred to herein as "communicator"), a main control unit 160 (alternatively referred to herein as "controller") and the first terminal 200 and communicates with the second terminal 300, which is the user's terminal. Hereinafter, the main control unit 160 may be the ECU and is denoted as a main control unit in order to distinguish it from the control unit of the first terminal 200 and the control unit of the second terminal 300.

The location obtaining unit 130 obtains a current location of the vehicle and transmits the obtained current location to the communication unit 150. The location obtaining unit 130 includes the GPS reception unit. The GPS reception unit includes an antenna for receiving signals of a plurality of GPS satellites, software for obtaining a location of the vehicle using distance and time information corresponding to location signals of the plurality of GPS satellites, and an output unit (alternatively referred to herein as "outputter") configured to output the obtained current location information of the vehicle.

The detecting unit 140 detects driving information of the vehicle and includes a speed detecting unit configured to detect a speed of the vehicle and a steering angle detecting unit configured to detect a steering angle of the vehicle. The steering angle detecting unit includes an angular velocity detecting unit configured to detect an angular velocity of the steering wheel in the vehicle.

The communication unit 150 may perform CAN communication, WiFi communication, Bluetooth communication, and USB communication. The communication unit 150 transmits and receives information among the location obtaining unit 130, the detecting unit 140 and the main control unit 160, and transmits and receives information between the main control unit 160 and the second terminal 300. That is, the communication unit 150 transmits current location information of the location obtaining unit 130 and driving information of the detecting unit 140 to the main control unit 160, transmits current location information corrected by the main control unit 160 to the second terminal 300, and transmits navigation information transmitted from the second terminal 300 to the first terminal 200.

The main control unit 160 measures a time from when current location information of the vehicle is obtained until navigation information transmitted from the second terminal 300 is output. That is, the main control unit 160 measures a time delay from when current location information is obtained until the current location information is mapped to map information and displayed. When the time delay is measured, transmission and reception information with the second terminal 300 may be test information or corrected current location information.

The main control unit 160 corrects current location information of the vehicle based on the measured time delay information and the driving information and controls transmission of the corrected current location information. The main control unit 160 performs signal processing on received navigation information when the navigation information transmitted from the second terminal 300 is received and controls an output of image information and sound information that are generated through signal processing. More specifically, when current location information of the vehicle is corrected, the main control unit 160 obtains a speed vector based on a speed of the vehicle, obtains a movement distance using the obtained speed vector and a time within the measured time delay information, identifies a change in an angle based on the detected angular velocity, and corrects current location information of the vehicle based on the obtained movement distance and change in the angle. That is, the main control unit 160 obtains a distance and a direction of additional movement from the current location.

When current location information of the vehicle is corrected while a speed change amount of the vehicle is a reference change amount or more, the main control unit 160 identifies a change amount of a location based on a time corresponding to the detected speed, integrates an absolute value of the identified change amount of the location based on a time with respect to a time to obtain a movement distance, identifies a change in an angle based on the detected angular velocity, and corrects current location information of the vehicle based on the obtained movement distance and change in the angle. The main control unit 160 periodically performs time synchronization with the second terminal 300, measures a time of information transmission and reception with the second terminal 300 and sets the measured time as a time delay. That is, the main control unit 160 periodically updates and stores the time delay.

When navigation information is received, the main control unit 160 performs signal processing on the received navigation information and controls transmission of the signal-processed navigation information.

That is, the main control unit 160 performs control such that the received navigation information is decoded and separated as image information and sound information, the separated image information is rendered, and the rendered image information is transmitted to the first terminal 200, and performs control such that the separated sound information is transmitted to the first terminal 200. The image information in the received navigation information includes map information to which the corrected current location information is mapped. Also, the sound information in the received navigation information includes path guidance information, road environment information and traffic information corresponding to the corrected current location information.

When destination information transmitted from the first terminal 200 is received, the main control unit 160 transmits the received destination information to the second terminal 300. When information on the path to the destination that is transmitted from the second terminal 300 is received, the main control unit 160 transmits the received path information to the first terminal 200. The path information includes map information to which a path from the current location to the destination is mapped. In addition, the main control unit 160 may decode the path information and transmit the decoded path information to the first terminal 200, and may perform rendering of the decoded path information and transmit the rendered path information to the first terminal 200.

The first terminal 200 may further include a port, such as a USB, and may perform USB communication with the main control unit 160. When the image information and sound information transmitted from the main control unit 160 are received, the first terminal 200 outputs the received image information and sound information. When the navigation function is selected, the first terminal 200 receives the destination from the user and transmits the received destination information to the main control unit 160. When the path information transmitted from the main control unit 160 is received, the first terminal 200 outputs the received path information.

As illustrated in FIG. 4, the first terminal 200, which is the vehicle terminal, includes a first input unit 210, a first control unit 220, a first display unit 230, a sound unit 240 and a first storage unit 250.

The first input unit 210 receives an operation on or off command, receives a selection of at least one function among a plurality of functions, and receives destination information when the navigation function is selected. The first input unit 210 may include a touch panel that is integrally provided in the first display unit 230. The first input unit 210 may also include at least one physical button (not illustrated) such as a power on or off button. Also, the first input unit 210 may further include a jog dial (not illustrated) or a touch pad for inputting a moving command, a selection command and the like of a cursor displayed on the first display unit 230. The jog dial or the touch pad may be provided in the center fascia and the like. The first input unit 210 transmits a manipulation signal of the button or a manipulation signal of the jog dial to the first control unit 220 and transmits a touch signal touched on the touch pad to the first control unit 220.

The first control unit 220 controls transmission of the input destination information and controls an output of the image information and the sound information of the navigation information.

The first display unit 230 displays the image information of the navigation information. The first display unit 230 displays an instruction and an icon having command information. Also, the first display unit 230 may display a Korean/English text button, for example, a number button, a special character button and the like for inputting the destination, and display a path guidance button for a path guidance command and the like. The first display unit 230 may display information on a phone call, an image of content, information on music reproduction, or display an external broadcasting signal as an image. The first input unit 210 may be implemented as the touch panel and the first display unit 230 may be implemented as a flat display panel, such as an liquid crystal display (LCD), a plasma display panel (PDP), an organic light-emitting diode (OLED), and the like. That is, the first input unit and the first display unit of the first terminal 200 may be implemented as a touch screen in which the touch panel and the flat display panel are integrally formed.

The sound unit 240 outputs the sound information of the navigation information, amplifies a sound signal in the received sound information to a predetermined size and outputs the result. That is, when the navigation function is performed, the sound unit 240 may output path and driving information as a sound, output sound information of content or external broadcasting, and output sound information such as music and radio selected by the user.

The first storage unit 250 stores information on the destination input by the user. The first storage unit 250 may further store music information, content information and the like.

The first terminal 200 of the present embodiments receives image information and sound information of the navigation information and path information that are decoded and rendered by the main control unit. Alternatively, the first terminal 200 may receive navigation information and path information and directly decode and render the received navigation information and path information.

The second terminal 300, which is the user's terminal, generates navigation information by mapping current location information provided from the main control unit 160 of the vehicle to map information, and provides the generated navigation information to the main control unit 160 of the vehicle.

As illustrated in FIG. 5, the second terminal 300, which is the user's terminal, includes a second input unit 310, a second control unit 320, a second display unit 330, a communication unit 340 and a second storage unit 350.

The second input unit 310 receives an operation on or off command and receives an information providing command for a navigation function connection. The second input unit 310 may receive a command for pairing with the vehicle 1. When a command for the navigation function connection is input, the second control unit 320 performs time synchronization with the main control unit 160 of the vehicle 1.

The second control unit 320 determines whether current location information corrected by the main control unit 160 of the vehicle 1 is received when time synchronization is successfully completed, extracts map information of a predetermined range including the corrected current location information when it is determined that the corrected current location information is received, generates navigation information by mapping the corrected current location information to the extracted map information, encodes the generated navigation information, and transmits the result to the main control unit 160 of the vehicle. The second control unit 320 receives transmission time information of the corrected current location information, identifies reception time information of the corrected current location information, identifies a time taken to transmit and receive the corrected current location information, and transmits information on the identified time taken to transmit and receive the corrected current location information to the main control unit 160.

The second control unit 320 may receive information on a time from when the current location information is obtained until the corrected current location information is transmitted. The second control unit 320 counts a time from when the corrected current location information is received until the navigation information is encoded and transmitted, transmits information on the counted time to the main control unit 160, and transmits transmission time information of the navigation information. That is, the second control unit 320 transmits information on a time from when current location information is received in the main control unit 160 until the navigation information is encoded, and transmits transmission time information of the navigation information, and therefore a time delay in the main control unit 160 may be measured.

The second control unit 320 controls communication with a server (not illustrated), receives map information provided from the server, and controls updating of the map information stored in the second storage unit 350. When current location information of the vehicle and destination information are received, the second control unit 320 searches for a path from the current location to the destination, encodes the found path information, and transmits the result to the main control unit 160. When the path is searched for, the second control unit 320 communicates with the server (not illustrated) and requests a path search from the server. When the path information found by the server is received, the second control unit 320 may encode the received path information and provide the result to the main control unit 160 of the vehicle.

In addition, the second control unit 320 may receive the encoded path information from the server. The server (not illustrated) communicates with the second terminal 300, and when a path search request signal transmitted from the second terminal 300 is received, searches for a path based on the location of the vehicle and the destination, and transmits the found path to the second terminal 300.

The second display unit 330 displays information corresponding to the navigation function connection. For example, the second display unit 330 may display navigation function connection performance information, time synchronization success information, path search success or fail information and the like.

The second input unit 310 may be implemented as a touch panel. The second display unit 330 may be implemented as a flat display panel, such as an LCD, a PDP, an OLED, and the like. That is, the second input unit and the second display unit of the second terminal 300 may be implemented as a touch screen in which the touch panel and the flat display panel are integrally formed.

The communication unit 340 performs wired and/or wireless communication such as USB, Bluetooth and WiFi. When the communication unit 340 provides USB communication, the communication unit 340 may be connected to a USB port of the multi-terminal 127 of the vehicle. The communication unit 340 may also communicate with the external server and periodically receive map information from the external server.

The second storage unit 350 stores the map information. The map information stored in the second storage unit 350 may be periodically updated. In this manner, when navigation information is generated using current location information of the vehicle that is obtained by the GPS reception unit of the vehicle with high precision and the map information that is stored in the user's terminal and has a short update cycle, it is possible to obtain navigation information more accurately.

Figure 6:
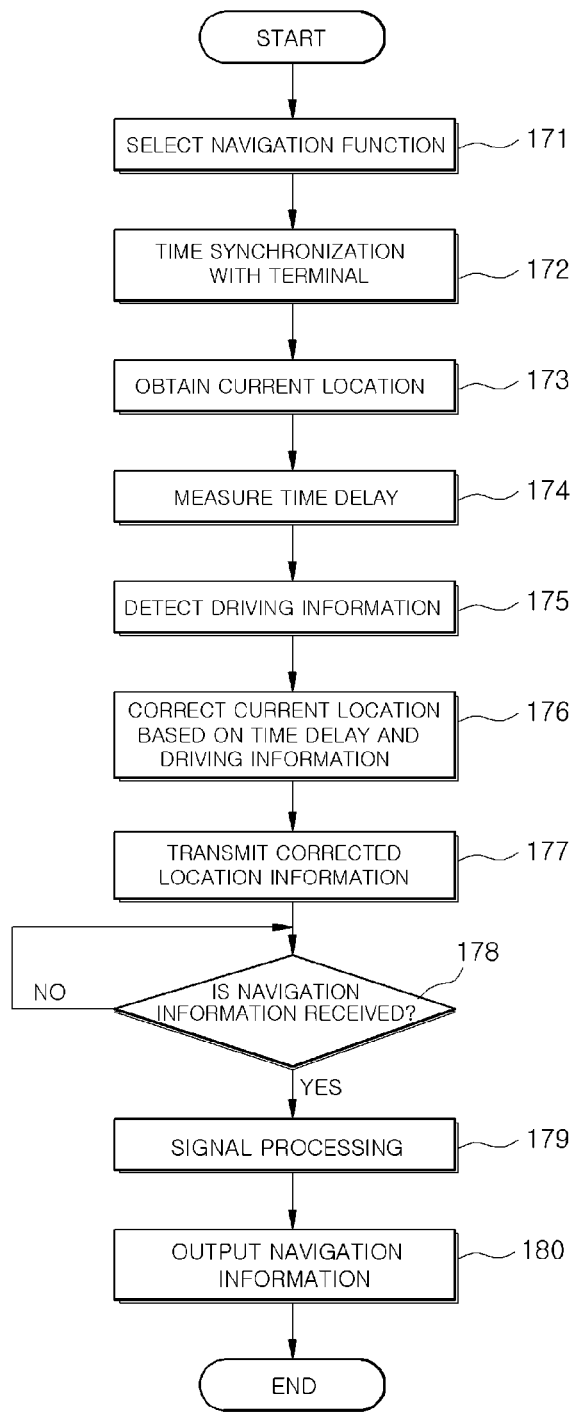
FIG. 6 is a control flowchart of the vehicle according to embodiments of the present disclosure.

FIG. 6 is a control flowchart of the vehicle according to embodiments of the present disclosure.

While the vehicle communicates with the second terminal 300, when a command of selecting the navigation function is input to the first input unit 210 of the first terminal 200 (171), time synchronization with the second terminal 300 is performed (172). In this case, the second terminal 300 may be connected to the USB port of the multi-terminal 127 of the vehicle, perform USB communication with the vehicle 1, or perform WiFi communication with the vehicle 1.

The vehicle operates the location obtaining unit 130 and obtains a current location of the vehicle based on satellite signals of a plurality of satellites received by the location obtaining unit 130 (173).

The vehicle transmits and receives information to and from the second terminal 300 and measures a time delay from when information is transmitted from the vehicle until information is received in the vehicle (174). A process of measuring a time delay will be described below in further detail with reference to FIGS. 7, 8 and 9.

Next, the vehicle detects driving information (175). The detection of driving information includes detection of a speed and a steering angle of the vehicle, and the detection of the steering angle includes detection of an angular velocity of the steering wheel.

Next, the vehicle corrects current location information based on measured time delay information, speed information and angular velocity information (176). A process of correcting a current location of the vehicle will be described in further detail below with reference to FIGS. 10 to 12.

Next, the vehicle transmits corrected current location information to the second terminal 300 (177). In this case, when the corrected current location information is received, the second terminal 300 extracts map information of a predetermined range including the received current location information, generates navigation information by mapping the corrected current location information to the extracted map information, encodes the generated navigation information, and transmits the result to the vehicle 1. The encoding of the navigation information includes encoding sound information for guiding traffic information, road environment information and the like of a location having the corrected current location information.

Next, the vehicle determines whether navigation information transmitted from the second terminal 300 is received (178), and when it is determined that the navigation information is received, performs signal processing on the received navigation information (179), and transmits the signal-processed navigation information to the first terminal 200. The signal processing of the navigation information includes decoding the navigation information and separating the navigation information as image information and sound information, and rendering the separated image information. That is, the vehicle transmits the rendered image information to the first terminal 200 and transmits the separated sound information to the first terminal 200.

Next, the first terminal 200 provided in the vehicle outputs the received navigation information (180). That is, the first terminal 200 displays the image information of the navigation information on the first display unit 230, outputs the sound information of the navigation information to the sound unit 240 and therefore provides path guidance information to the user.

In addition, when the destination is input to the first terminal 200, the vehicle transmits the input destination information to the second terminal 300, and when the path information transmitted from the second terminal 300 is received, the vehicle displays the received path information on the first terminal 200. In this case, when navigation information is provided, the second terminal may generate navigation information by mapping path information of displaying a path to the destination and corrected current location information to map information, encode the generated navigation information, and transmit the result to the first terminal 200.

The vehicle outputs the navigation information transmitted from the second terminal through the first terminal. Therefore, it is possible to provide a path guidance service with high precision. In this manner, the vehicle provides navigation information to the user and periodically performs time synchronization with the second terminal 300, and when time synchronization with the second terminal 300 is successfully completed, measures a time delay for information transmission and reception, performs correction of current location information based on the measured time delay, and provides navigation information.

Figure 7:
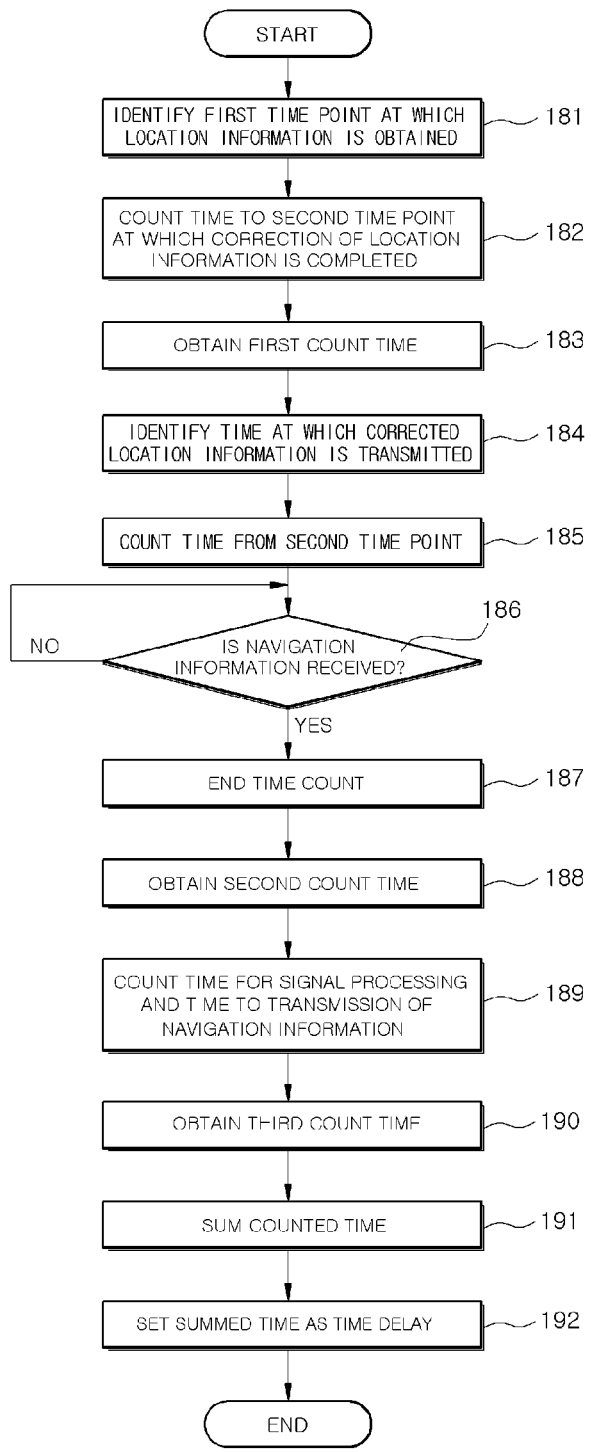
FIG. 7 is a flowchart illustrating measurement of a time delay when information is transmitted and received between a vehicle and a user's terminal according to embodiments of the present disclosure.
Figure 8:
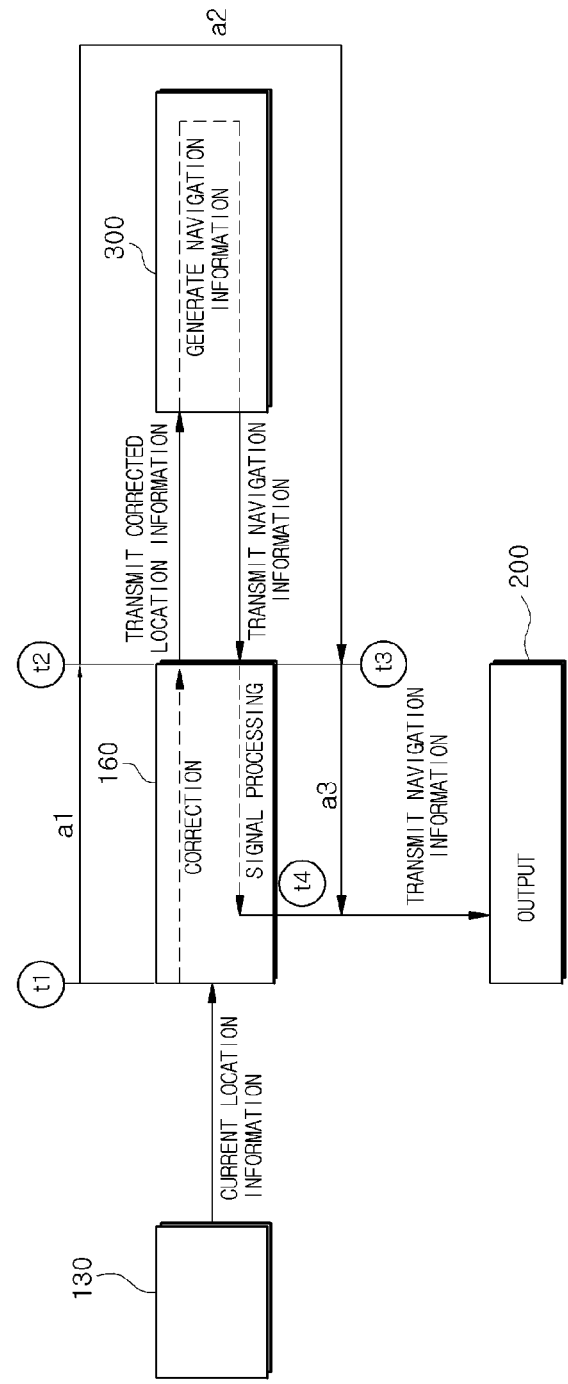
FIGS. 8 and 9 are exemplary diagrams illustrating information transmission and reception between a control unit of the vehicle and the user's terminal according to embodiments of the present disclosure.

FIG. 7 is a flowchart illustrating measurement of a time delay when information is transmitted and received between a vehicle and a user's terminal according to embodiments of the present disclosure. Description will be provided with reference to FIG. 8.

The vehicle periodically obtains current location information of the vehicle from the location obtaining unit 130. The vehicle identifies a first time point t1 at which the current location is received by the main control unit 160 (181).

The vehicle counts a time from the identified first time point t1 (182), and when correction of the location is completed, ends the time count. In this case, the vehicle may obtain a first count time a1 (183).

Next, the vehicle transmits the corrected current location information, identifies a second time point t2 at which the corrected current location information is transmitted (184), and counts a time from the second time point t2 (185). In addition, the time at which the corrected current location information is transmitted may be the same as the time at which correction is completed.

Next, the vehicle determines whether the navigation information transmitted from the second terminal is received (186), and when it is determined that the navigation information is received, ends the time count (187).

Next, the vehicle identifies a time from the second time point until when the navigation information is received. That is, the vehicle may obtain a second count time a2 taken to transmit and receive information to and from the second terminal (188).

Next, the vehicle identifies a third time point t3 at which the navigation information is received and counts a time from the identified third time point to the fourth time point t4 at which signal processing is performed and before the navigation information whose signal processing is completed is transmitted to the first terminal 200 (189).

Next, when it is determined that signal processing of the navigation information is completed, the vehicle obtains a third count time a3 based on the counted time (190). The vehicle sums the obtained first count time, second count time and third count time (191) and sets the summed time as a time delay (192). Through such processes, it is possible to measure a time delay for information transmission and reception between the vehicle and the second terminal.

In addition, a time from when satellite signals transmitted from satellites are received until current location information is obtained, and a time from the navigation information is transmitted until the first terminal outputs the received navigation information may be determined in advance. That is, the vehicle may measure a time delay by including the time at which the current location information is obtained and the time at which the navigation information is output in the time delay.

Figure 9:
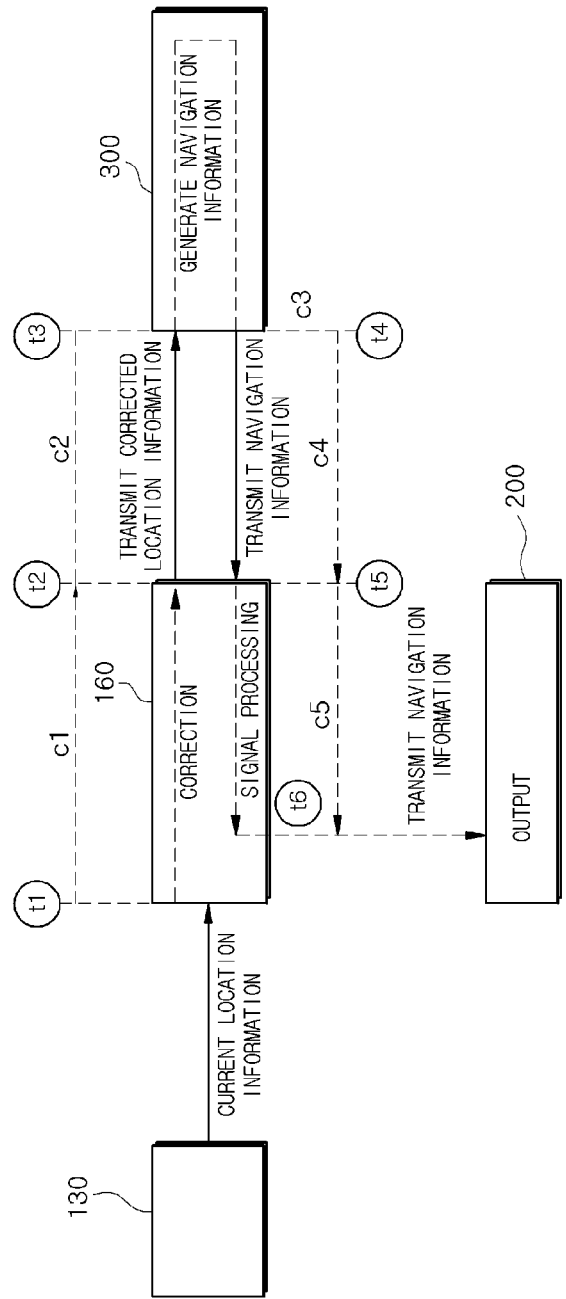

FIG. 9 shows another example of measuring a time delay.

The vehicle periodically obtains current location information of the vehicle from the location obtaining unit 130. The vehicle identifies a first time point t1 at which current location information is obtained.

Next, the vehicle identifies a second time point t2 at which correction of current location information is completed, compares the first time point and the second time point, identifies a first consumed time c1 between the first time point and the second time point, and transmits information on the identified first consumed time c1 and information on the identified second time point t2 to the second terminal 300. The second time point t2 may be the same as a time at which corrected current location information is transmitted.

The second terminal 300 receives information on the first consumed time c1 and information on the second time point t2, identifies a received third time point t3, compares the identified second time point t2 and third time point t3, and identifies a second consumed time c2 between the second time point and the third time point. That is, the second consumed time c2 is a time taken to transmit information from the vehicle to the second terminal 300.

The second terminal 300 identifies a fourth time point t4 at which generation and encoding of the navigation information are completed, compares the third time point and the fourth time point, identifies a third consumed time c3 between the third time point and the fourth time point, and transmits information on the identified third consumed time c3 and information on the identified fourth time point t4 to the vehicle. The fourth time point t4 may be the same as a time at which the navigation information is transmitted.

The vehicle receives information on the third consumed time c3 and information on the fourth time point t4 transmitted from the second terminal, and identifies information on the third consumed time c3 and a fifth time point t5 at which information on the fourth time point t4 is received. The vehicle compares the fourth time point t4 and the fifth time point t5 and identifies a fourth consumed time c4 between the fourth time point t4 and the fifth time point t5. That is, the fourth consumed time c4 is a time taken to transmit information from the second terminal 300 to the vehicle.

When decoding and rendering of the received navigation information are completed, the vehicle identifies a sixth time point t6 at which navigation information is transmitted to the first terminal 200, compares the fifth time point and the sixth time point, and identifies a fifth consumed time c5 between the fifth time point and the sixth time point t6. The vehicle sums the first consumed time, the second consumed time, the third consumed time, the fourth consumed time and the fifth consumed time, and sets the summed time as a time delay.

Figure 10:
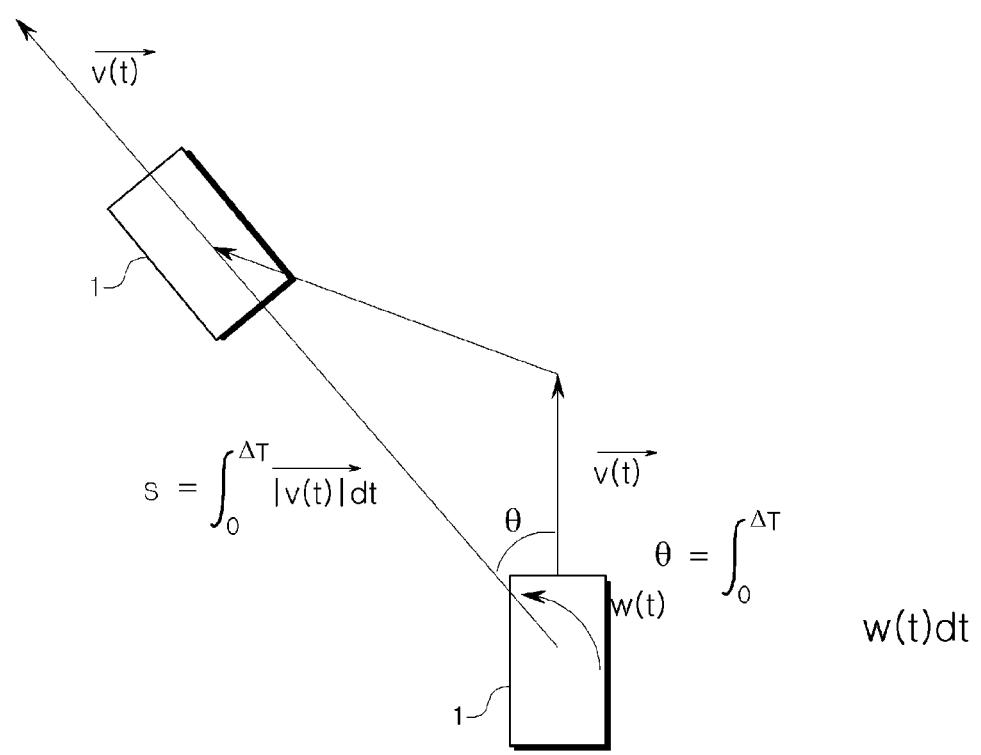
FIG. 10 is an exemplary diagram illustrating location correction of the vehicle according to embodiments of the present disclosure.

FIG. 10 is an exemplary diagram illustrating location correction of the vehicle according to embodiments of the present disclosure.

While a speed change amount of the vehicle is less than a reference change amount, when current location information of the vehicle is corrected, a speed vector ($\vec{v}$) is obtained based on a speed of the vehicle, and a movement distance (s) is calculated using the obtained speed vector and a time ($\Delta T$) in the measured time delay information.

$$s = \Delta T \cdot \vec{v}$$

By obtaining a location when the vehicle moves by the calculated movement distance from a current location, the location of the vehicle may be corrected.

Then, the vehicle identifies a change in an angle by integrating the detected angular velocity (w(t)). That is, the integration value of the angular velocity represents a change in an angle, and an angle ($\sigma$) changed during the time delay is $\int_0^{\Delta T} w(t)dt$.

In the current location information, information on a changed location after the time delay $\Delta T$ includes the movement distance and the angle, and this will be expressed as the following formula.

$$\Delta T \cdot |\vec{v}| e^{i(\angle \vec{v} + \int_0^{\Delta T} w(t)dt)}$$

That is, when an initial angle value $\angle \vec{v}$ of an initial speed vector $\vec{v}$ is added to an angle change amount $\int_0^{\Delta T} w(t)dt$, the result represents an absolute angular displacement value after $\Delta T$.

Also, when an absolute value of the speed is multiplied by $\Delta T$, this represents a change amount of a location scalar.

Therefore, the above formula represents a location vector after $\Delta T$.

When it is assumed that the steering wheel is not manipulated and therefore w(t)=0 is established, $$\Delta T \cdot |\vec{v}| e^{i \angle \vec{v}} = \Delta T \cdot \vec{v}$$

is established in the above formula. Therefore, it can be understood that the same result is derived as when the steering wheel is not manipulated.

While the speed change amount of the vehicle is the reference change amount or more, when the current location information of the vehicle is corrected, a change amount of a location with respect to a time corresponding to the detected speed is identified, an absolute value of the identified change amount of the location with respect to the time is integrated based on a time to obtain a movement distance, the detected angular velocity is integrated to identify a change in an angle, and current location information of the vehicle is corrected based on the obtained movement distance and change in the angle.

When a speed rapidly changes, a speed vector function with respect to a time may be represented as $\vec{v(t)}$, and an absolute value of the movement distance may be represented as integration with respect to a time.

That is, when the movement distance is represented as s, $s = \int_0^{\Delta T} |\vec{v(t)}| dt$ is established. Therefore, the changed location may be represented as the following formula.

$$\int_0^{\Delta T} |\vec{v(t)}| dt \cdot e^{i(\angle \vec{v} + \int_0^{\Delta T} w(t)dt)}$$

Figure 11:
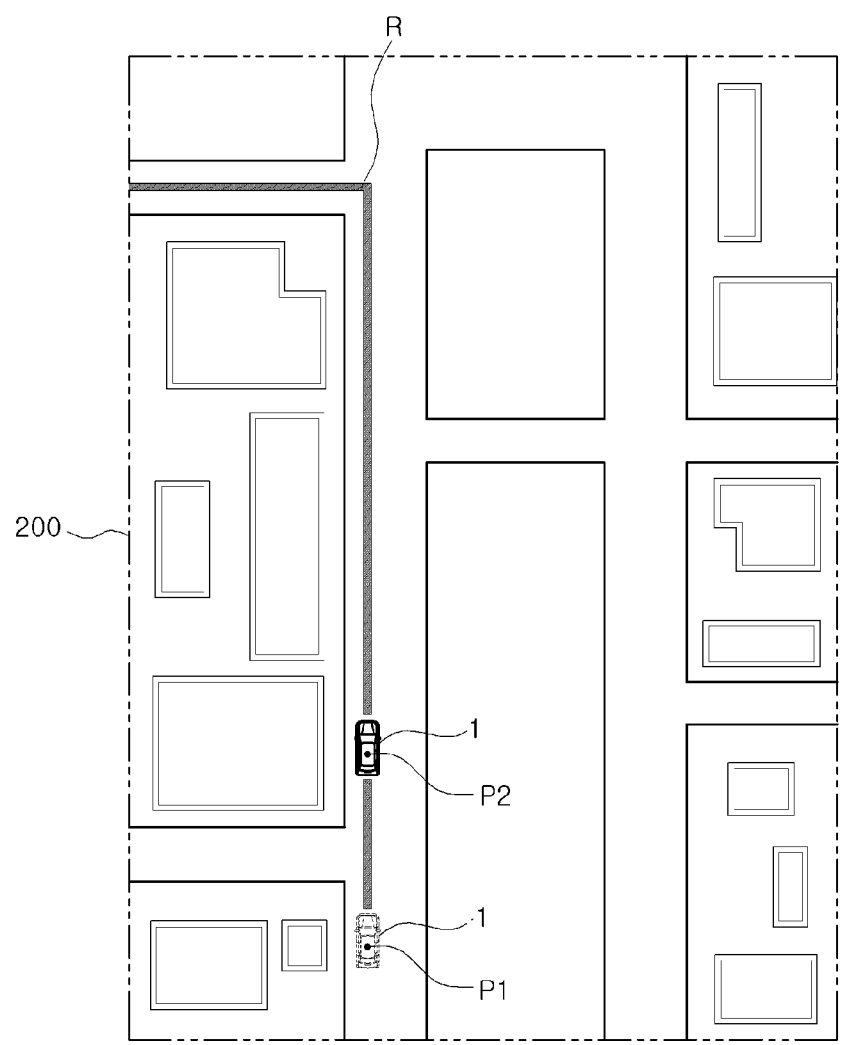
FIGS. 11 and 12 are exemplary diagrams illustrating a navigation information display of the vehicle according to embodiments of the present disclosure.
Figure 12:
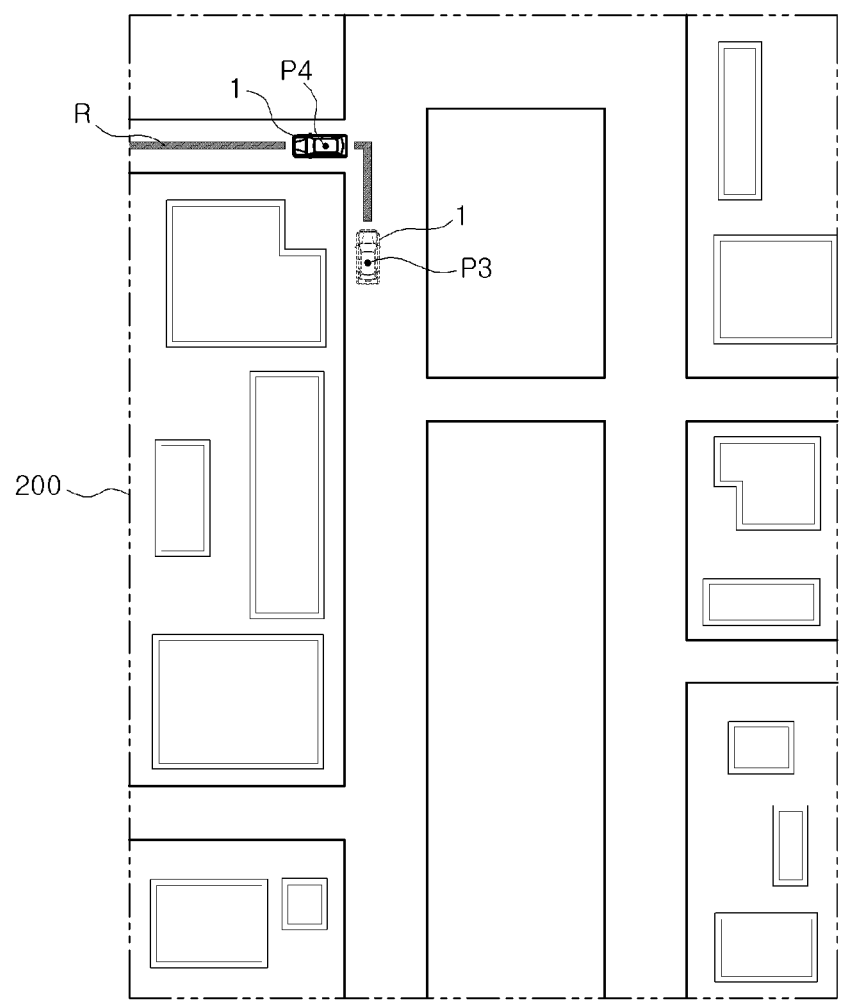

FIGS. 11 and 12 are exemplary diagrams illustrating a navigation information display of the vehicle according to embodiments of the present disclosure.

As illustrated in FIG. 11, the vehicle obtains current location information P1 of the vehicle using the location obtaining unit 130, corrects the obtained current location information of the vehicle, and transmits the information to the second terminal 300. The second terminal 300 generates navigation information by mapping the corrected current location information P2 to map information and transmits the generated navigation information to the vehicle.

The first terminal 200 provided in the vehicle displays navigation information transmitted from the second terminal 300. In this case, the first terminal 200 may display map information to which the corrected current location information P2 and path information R are mapped. The vehicle that travels according to found path information performs straight driving without a change in a direction. Accordingly, on the first terminal 200, the vehicle is displayed at a location that is moved a predetermined distance from a location obtained by the location obtaining unit.

As illustrated in FIG. 12, the vehicle obtains current location information P3 of the vehicle using the location obtaining unit 130, corrects the obtained current location information of the vehicle, and transmits the information to the second terminal 300. The second terminal 300 generates navigation information by mapping corrected current location information P4 to map information, and transmits the generated navigation information to the vehicle.

The first terminal 200 provided in the vehicle displays navigation information transmitted from the second terminal 300. In this case, the first terminal 200 may display map information to which the corrected current location information P4 and the path information R are mapped. The vehicle that travels according to found path information performs a left turn and moves. Accordingly, on the first terminal 200, the vehicle is displayed at a location that is moved a predetermined distance from a location obtained from the location obtaining unit and in which a direction is changed at a predetermined angle. In this manner, the location of the vehicle that is obtained by the location obtaining unit is not displayed on the first terminal, but the location of the vehicle is displayed on the first terminal in consideration of a distance and a direction of the vehicle that moves during an information transmission and reception time. Therefore, it is possible to provide the location of the vehicle to the user more accurately.

Figure 13:
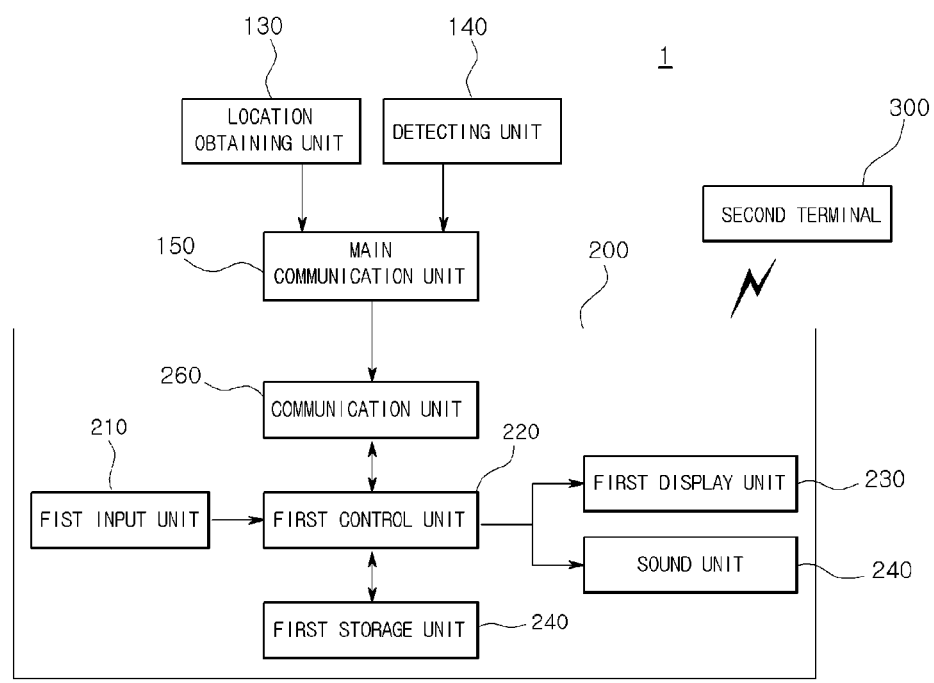
FIG. 13 is a control configuration diagram of a vehicle according to embodiments of the present disclosure.

Furthermore, FIG. 13 is a control configuration diagram of a vehicle according to embodiments of the present disclosure.

As illustrated in FIG. 13, the vehicle 1 includes the location obtaining unit 130, the detecting unit 140, the main communication unit 150 and the first terminal 200, and performs communication with the second terminal 300, which is the user's terminal. The vehicle may enable a function performed by the main control unit to be performed in the first terminal, as described above. The main communication unit 150 may perform CAN communication, WiFi communication, Bluetooth communication, and USB communication. The main communication unit 150 transmits and receives information among the location obtaining unit 130, the detecting unit 140 and the first terminal 200, and transmits and receives information between the first terminal 200 and the second terminal 300. That is, the communication unit 150 transmits current location information of the location obtaining unit 130 and driving information of the detecting unit 140 to the first terminal 200, transmits current location information corrected by the first terminal 200 to the second terminal 300, and transmits navigation information transmitted from the second terminal 300 to the first terminal 200.

The first terminal 200 measures a time from when current location information of the vehicle is obtained until navigation information transmitted from the second terminal 300 is output. That is, the first terminal 200 measures a time delay from when the current location information is obtained until the information is mapped to map information and displayed. The first terminal 200 corrects current location information of the vehicle based on the measured time delay information and driving information, and controls transmission of the corrected current location information.

When navigation information transmitted from the second terminal 300 is received, the first terminal 200 performs signal processing on the received navigation information, and controls image information and sound information that are generated through signal processing. The first terminal 200 includes the first input unit 210, the first control unit 220, the first display unit 230, the sound unit 240, the first storage unit 250 and a communication unit 260. The first input unit 210 receives an operation on or off command, receives a selection of at least one function among a plurality of functions, and when the navigation function is selected, receives information on the destination.

The first control unit 220 measures a time from when current location information of the vehicle is obtained until navigation information transmitted from the second terminal 300 is output, corrects current location information of the vehicle based on the measured time delay information and driving information, and controls transmission of the corrected current location information. That is, the first terminal 200 measures a time delay from when the current location information is obtained until the information is mapped to the map information and displayed. More specifically, when current location information of the vehicle is corrected, the first control unit 220 obtains a speed vector based on a speed of the vehicle, obtains a movement distance using the obtained speed vector and a time within the measured time delay information, identifies a change in an angle based on the detected angular velocity, and corrects current location information of the vehicle based on the obtained movement distance and change in the angle. That is, the first control unit 220 obtains the movement distance and the direction that are changed from the current location.

When current location information of the vehicle is corrected while a speed change amount of the vehicle is a reference change amount or more, the first control unit 220 identifies a change amount of a location based on a time corresponding to the detected speed, integrates an absolute value of the identified change amount of the location based on a time with respect to a time to obtain a movement distance, identifies a change in an angle based on the detected angular velocity, and corrects current location information of the vehicle based on the obtained movement distance and change in the angle.

The first control unit 220 periodically performs time synchronization with the second terminal 300, measures an information transmission and reception time with the second terminal 300, and sets the measured time as a time delay. That is, the first control unit 220 periodically updates and stores the time delay. When the navigation information is received, the first control unit 220 performs signal processing on the received navigation information and controls an output of the signal-processed navigation information. That is, the first control unit 220 performs control such that the received navigation information is decoded and separated as image information and sound information, the separated image information is rendered, and the rendered image information is output, and performs control such that the separated sound information is output.

The image information in the received navigation information includes map information to which the corrected current location information is mapped. Also, the sound information in the received navigation information includes path guidance information, road environment information and traffic information corresponding to the corrected current location information. When information on the destination is input, the first control unit 220 transmits the input destination information to the second terminal 300, and when information on the path to the destination that is transmitted from the second terminal 300 is received, the first control unit 220 outputs the received path information. The path information includes map information to which the path from the current location to the destination is mapped.

The first display unit 230 displays operation information based on a command of the first control unit 220 as an image. The sound unit 240 displays operation information based on a command of the first control unit 220 as a sound. The first storage unit 250 stores information on the destination input by the user. The first storage unit 250 may further store music information, content information and the like.

The second terminal 300, which is the user's terminal, generates navigation information by mapping current location information provided from the main control unit 160 of the vehicle to map information, and transmits the generated navigation information to the terminal 200 of the vehicle. The second terminal 300, which is the user's terminal, directly communicates with the first terminal 200 rather than the main control unit, and transmits and receives information.

According to the present disclosure, when a vehicle and a user's terminal are connected, a location of the vehicle is corrected based on a time delay for information transmission and reception between the vehicle and the user's terminal, and current location information and driving information of the vehicle. Therefore, it is possible to increase precision of an actual location of the vehicle and increase quality of a service based on current location information of the vehicle such as path guidance during navigation. Also, time synchronization between the vehicle and the terminal is periodically performed to measure the time delay and a location of the vehicle is corrected according to a measurement result of the time delay. Therefore, even when a physical transmission channel characteristic is changed due to use of a wireless channel and the like and therefore the time delay is changed, it is possible to obtain a location of the vehicle accurately. Moreover, since guidance on a path is provided using map information of the user's terminal, latest map information and traffic information and the like are used when guidance on the path is provided. Therefore, it is possible to increase path guidance performance. Therefore, according to the present disclosure, it is possible to increase quality of the terminal provided in the vehicle and increase marketability. Further, it is possible to increase user satisfaction, user convenience, and safety of the vehicle.

While the contents of the present disclosure have been described in connection with what is presently considered to be exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A vehicle that communicates with an external terminal, the vehicle comprising:
 a location obtainer configured to receive satellite signals from a plurality of satellites and obtain current location information indicating a current location of the vehicle based on the received satellite signals;
 a detector configured to detect driving information of the vehicle;
 a controller configured to count a time delay for information transmission and reception with the terminal, correct the current location information based on the counted time delay and the detected driving information, control transmission of the corrected current location information, and control an output of navigation information received from the terminal;
 a communicator configured to transmit the corrected current location information to the terminal and receive the navigation information transmitted from the terminal; and
 an outputter configured to output the received navigation information, wherein
 the navigation information includes map information to which the corrected current location information is mapped,
 the counted time delay includes a first time for correcting the current location information, a second time for generating the navigation information, and a third time for performing a signal processing of the navigation information, and
 the controller is further configured to count the first time from when the current location information is obtained until the current location information is corrected, count the second time from when the corrected current location information is transmitted to the terminal until the navigation information is received, and count the third time from when the navigation information is received until the signal processing of the navigation information is completed.

2. The vehicle according to claim 1, wherein:
 the driving information includes speed information and steering angle information of the vehicle,
 the detector includes a speed detector to detect the speed information and a steering angle detector to detect an angular velocity of a steering wheel corresponding to the steering angle information, and
 the controller is further configured to obtain a speed vector based on the speed of the vehicle, obtain a movement distance using the obtained speed vector and a time of the counted time delay, identify a change in an angle based on the detected angular velocity, and correct the current location information based on the obtained movement distance and the identified change in the angle.

3. The vehicle according to claim 1, wherein:
 the outputter is further configured to display image information in the received navigation information via a display unit and to output sound information in the received navigation information via a sound unit, and
 the controller is further configured to decode and render the image information in the received navigation information and amplify the sound information in the received navigation information.

4. The vehicle according to claim 1,
 wherein the controller is further configured to perform time synchronization with the terminal when information is transmitted to and received from the terminal.

5. The vehicle according to claim 4,
 wherein the controller is further configured to periodically update the counted time delay.

6. A method of controlling a vehicle that communicates with an external terminal, the method comprising:
 obtaining current location information indicating a current location of the vehicle based on a satellite signal received by a global positioning system (GPS) reception unit when a navigation function is selected;
 counting, by a controller, a time delay for information transmission and reception with the terminal;
 detecting, by a detector, driving information of the vehicle;
 correcting, by the controller, the current location information based on the counted time delay and the detected driving information;

transmitting the corrected current location information to the terminal; and outputting navigation information that is received from the terminal, wherein the navigation information includes map information to which the corrected current location information is mapped, the counted time delay includes a first time for correcting the current location information, a second time for generating the navigation information, and a third time for performing a signal processing of the navigation information, and the counting of the time delay comprises:

counting the first time from when the current location information is obtained until the current location information is corrected, counting the second time from when the corrected current location information is transmitted to the terminal until the navigation information is received, and counting the third time from when the navigation information is received until the signal processing of the navigation information is completed.

7. The method according to claim 6, wherein the detecting of the driving information of the vehicle comprises detecting a speed of the vehicle.

8. The method according to claim 7, wherein the correcting of the current location information comprises:

obtaining a speed vector based on the speed of the vehicle;

obtaining a movement distance using the obtained speed vector and a time of the measured time delay; and correcting the current location information based on the obtained movement distance.

9. The method according to claim 6, wherein the detecting of the driving information comprises detecting a speed of the vehicle and an angular velocity of a steering wheel of the vehicle.

10. The method according to claim 9, wherein the correcting of the current location information comprises:

obtaining a speed vector based on the speed of the vehicle;

obtaining a movement distance using the obtained speed vector and a time of the measured time delay;

identifying a change in an angle based on the detected angular velocity; and correcting the current location information based on the obtained movement distance and the identified change in the angle.

11. The method according to claim 6, wherein the outputting of the received navigation information includes:

decoding and rendering image information in the received navigation information;

displaying the rendered image information;

amplifying sound information in the received navigation information; and outputting the amplified sound information.

12. The method according to claim 6, wherein the counting of the time delay comprises performing time synchronization with the terminal.

13. A first terminal for a vehicle that communicates with a second terminal for an external terminal, the first terminal comprising:

a location obtainer configured to receive satellite signals from a plurality of satellites and obtain current location information indicating a current location of the first terminal based on the received satellite signals;

a communicator configured to receive driving information of the vehicle; and a controller configured to count a time delay for information transmission and reception with the second terminal, correct the current location information based on the counted time delay and the received driving information, control transmission of the corrected current location information to the second terminal via the communicator, and control receipt of navigation information from the second terminal via the communicator, wherein the navigation information includes map information to which the corrected current location information is mapped, the counted time delay includes a first time for correcting the current location information, a second time for generating the navigation information, and a third time for performing a signal processing of the navigation information, and the controller is further configured to count the first time from when the current location information is obtained until the current location information is corrected, count the second time from when the corrected current location information is transmitted to the second terminal until the navigation information is received, and count the third time from when the navigation information is received until the signal processing of the navigation information is completed.

14. The first terminal according to claim 13, wherein:

the driving information includes speed information of the vehicle and steering angle information of the vehicle.

15. The first terminal according to claim 14, wherein the controller is further configured to decode the received navigation information, separate the received navigation information into image information and sound information, and render the decoded image information.

16. The first terminal according to claim 13, wherein the controller is further configured to perform time synchronization with the second terminal and periodically update the counted time delay.

17. The first terminal according to claim 13, further comprising:

a detector including a speed detector configured to detect a speed of the vehicle and a steering angle detector configured to detect a steering angle of the vehicle.

* * * * *